Aug. 25, 1959  R. ORLIK  2,900,754
FISH BAIT

Filed Nov. 28, 1958  2 Sheets-Sheet 1

INVENTOR.
ROMAN ORLIK

Aug. 25, 1959   R. ORLIK   2,900,754
FISH BAIT
Filed Nov. 28, 1958   2 Sheets-Sheet 2
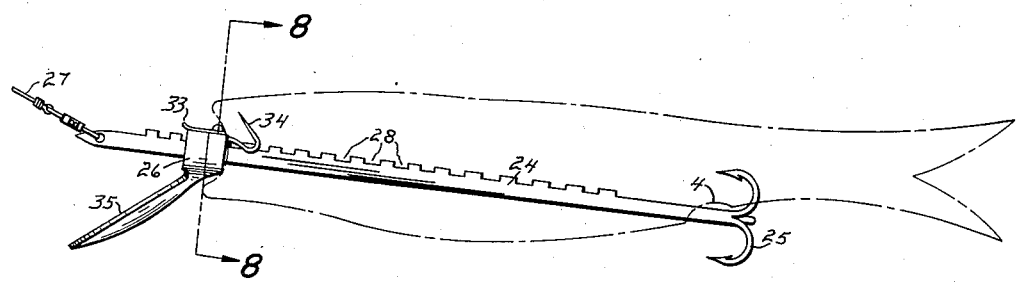
Fig. 7
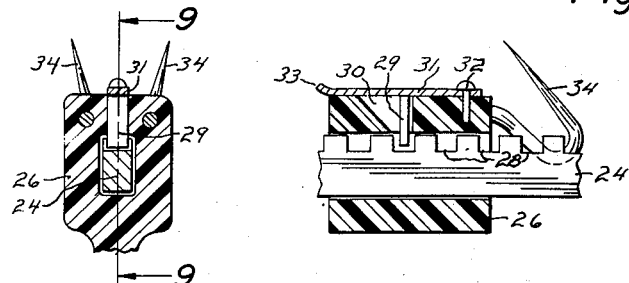
Fig. 8   Fig. 9
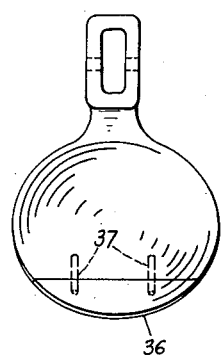   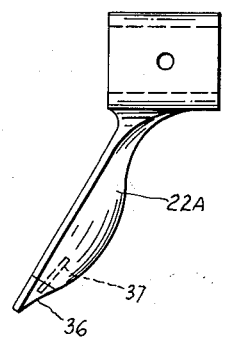
Fig. 11   Fig. 10
INVENTOR
ROMAN ORLIK United States Patent Office 2,900,754
Patented Aug. 25, 1959

2,900,754
FISH BAIT

Roman Orlik, Cleveland, Ohio

Application November 28, 1958, Serial No. 776,795

3 Claims. (Cl. 43—44.2)

The invention hereof relates to fish bait; and particularly to fish bait that comprises a small fish or minnow having attachment means thereon for attaching a hook and a line to the minnow.

There has been proposed heretofore an attachment device for this purpose in the form of a bar projected through the body of the minnow, in at the minnow mouth and out at the minnow vent, or vice versa; with a hook on its rearward or vent end, and a gripping device on the forward or mouth end of the bar gripping the head of the minnow to attach the minnow to the bar; and the bar forwardly beyond the gripping device being formed for the attachment of a line thereto.

The present invention relates to attaching means of this general class.

Minnows with attachment devices of this general class as heretofore proposed, are not successful in attracting and catching predatory fish. The reason in some cases is that the gripping device is on the outside of the minnow head and therefore gives the head an unnatural appearance and also is so conspicuous that it warns an approaching predatory fish, as to the unnatural character of the minnow, and he will not take it.

The reason in other cases is that the atttachment device is intentionally so formed as to give the minnow lateral movements as it is drawn through the water, in the attempt to make it appear alive and therefore attractive to the predatory fish; one such expedient being to shape the bar going through the minnow so as to put a permanent bend in the minnow body.

But the movements thus given to the minnow body are not natural movements, sometimes causing the body to roll, and this is detected by the predatory fish and he will not take it.

The attachment means of the present invention comprises a small inconspicuous device on the forward end of the bar, projecting into the minnow mouth, and having barbs thereon that hook forwardly into the interior surface of the mouth. The device is tubular and telescopingly fits upon the bar. There is nothing on the outside of the head to obscure its natural form and appearance.

A water-reaction vane, of transparent, inconspicuous material, such as a molded plastic, depends from the tubular device in a forwardly inclined direction; so that when drawn forwardly through the water it exerts a downward thrust on the tubular device, and therefore on the minnow head; which prevents the minnow head and body from rotating unnaturally.

The vane is formed so that it also reacts on the water in a manner to cause it to reciprocate laterally, from side to side. This movement is communicated to the tubular device and minnow head, giving the head a movement from side to side as it proceeds forwardly through the water; and the whole minnow therefore has the natural appearance of swimming forwardly, which makes it appear alive and attractive to the predatory fish.

The bar is adjustably movable in the tubular device and at first is extended at its rearward end beyond the vent for the attachment of a hook thereto, and is then drawn forwardly to retract the rearward end into the vent, leaving only the hook exposed.

The bar is then locked to the tubular device with its forward end projecting beyond it for attachment of a line.

The attachment means is thus adapted to minnows of different length.

As another form of the above described attachment means, the bar has a hook or hooks permanently attached to its rearward end; and the bar is projected forwardly into the vent and through the body and out at the mouth.

The said tubular device is then telescoped over the forward end of the bar and into the minnow mouth and locked to the head by its said bars; and the tubular device is then locked to the bar.

The line is then attached to the forward end of the bar.

The mode of operation is the same as that described above for the first form.

The invention is fully disclosed in the following description considered in connection with the accompanying drawing in which:

Fig. 7 is a view similar to Fig. 1 showing another form of the attachment means;

Fig. 8 is a sectional from the plane 8—8 of Fig. 7;

Fig. 9 is a sectional view from the plane 9—9 of Fig. 8;

Fig. 10 is a view of a water reacting vane of Figs. 1 to 9 showing a modification; and Fig. 11 is a front elevational view of the vane of Fig. 10.

Figure 1:
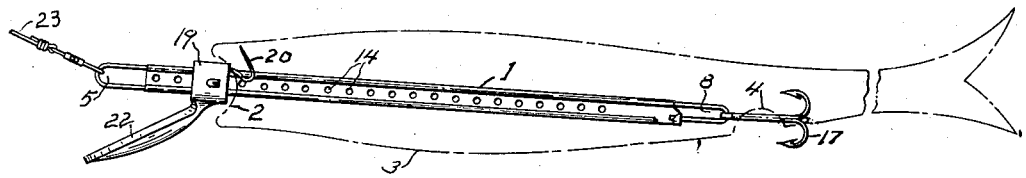
Fig. 1 is a view to enlarged scale of a minnow with an attachment means embodying the invention in one form assembled therewith.

Referring to the drawing there is shown in Fig. 1 an attaching means embodying the invention, completely assembled with a minnow shown in broken lines.

The attaching means comprises a bar 1 which has been projected into the minnow mouth 2 through the body 3 to the minnow vent 4.

Figures 2, 3:
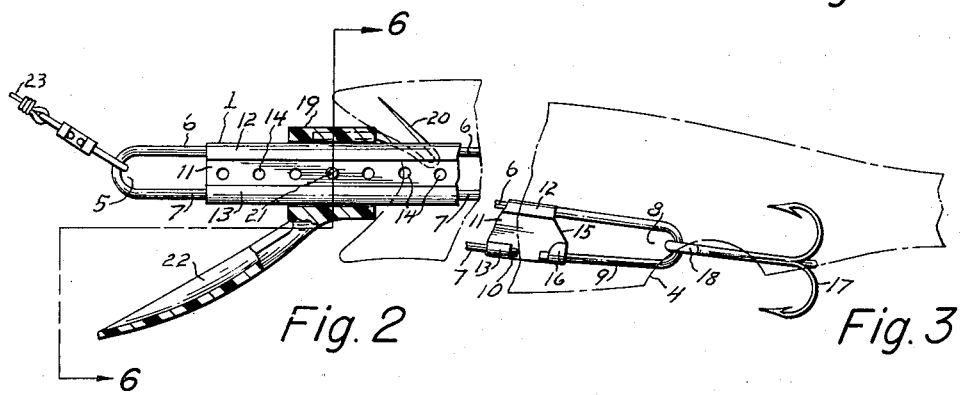
Fig. 2 is a view partly in section of the forward part of Fig. 1, drawn to a still larger scale.
Fig. 3 is a view of the rearward part of Fig. 1 to the scale of Fig. 2.
Figures 4, 5:
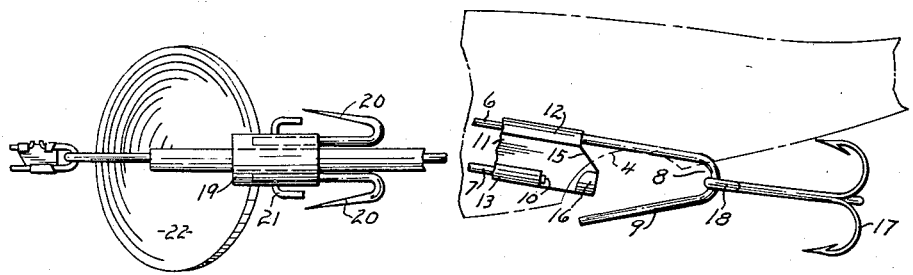
Fig. 4 is a view corresponding to Fig. 3 illustrating the attachment means in the process of being assembled with the minnow.
Fig. 5 is a top plan view of the parts of Fig. 2.

The parts at the forward and rearward ends of the bar 1 are shown to enlarge scale in Figs. 2 and 5. The bar 1 is composed of a wire having a V-form loop 5 at the forward end and two parallel portions 6 and 7 extending rearwardly from the loop 5.

The portion 6 is formed into a loop 8 at the rearward end and one side of the loop terminates in a free end at 9.

The portion 7 of the wire terminates short of the loop 8 at 10.

A strip of sheet metal 11 is bent or crimped at its edges as at 12—13 around the respective parallel wire portions 6 and 7, which makes a rigid bar construction of the strip and wire portions, of oval cross section.

The strip 11 has a plurality of closely spaced perforations 14—14 therein, between the wire portions 6 and 7.

The rear end 15 of the strip 11 terminates short of the loop 8 and is formed with a short upright tongue 16 which, with the strip itself, provides an upwardly open receptacle.

The free end 9 of the wire is resilient and may be manually bent to lodge it in the receptacle behind the tongue 16 as shown in Fig. 3.

This operation closes the loop 8 on the rearward end of the bar and is in this condition when the bar is first projected through the minnow.

The loop 8 is at first projected beyond the vent 4 and the free end 9 of the wire is then removed from the receptacle as in Fig. 4; and a hook 17 with an eye 18 has the eye telescoped over the free end 9 and the free end is again lodged in the receptacle.

With the hook thus mounted on the rear end of the bar the bar is pulled or pushed forwardly until its rear end is retracted through the vent 4 and rendered invisible, leaving the hook outside the vent, as in Fig. 3.

A tubular element 19 is telescoped over the forward end of the bar and moved rearwardly into the minnow's mouth, when the bar has been pulled forwardly as described.

The tubular element 19 has a pair of barbs 20—20 thereon with their pointed ends extending forwardly. When the tubular element 19 is pressed firmly against the flesh on the inside of the mouth and then released, or given a slight pull forwardly, the barbs will pierce the flesh inside the mouth.

This locks the tubular element 19 to the minnow's head, and prevents rotation of the head on the element 19.

Figure 6:
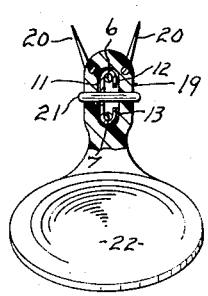
Fig. 6 is a view partly in section taken from the plane 6—6 of Fig. 2.

The bar as shown in the drawing, Fig. 6, is generally oval in cross section, and the inner wall of the tubular element 19 is formed to fit it, so that it cannot rotate on the bar.

The tubular element has a laterally extending hole therethrough which can readily be aligned with a perforation 14 in the bar, and then a pin or piece of soft wire 21 is threaded through the aligned holes and bent over at its ends.

This locks the bar to the tubular element, and prevents the bar from shifting longitudinally.

The tubular element 19 has a water reaction vane 22 extending downwardly at a forward inclination from the under side of the tubular element 19.

As seen from the foregoing description, there are no parts of the attachment means on the outside of the minnow head, so that it has its natural appearance to a predatory fish. The tubular element 19 appears to the predatory fish as projecting forwardly out of the minnow's mouth, and has the natural appearance, of something edible that the minnow is holding in its mouth.

The depending vane 22 will appear to be part of the edible substance, and not detract from the natural appearance of the minnow head.

But to make the tubular element 19 and its depending vane 22 as inconspicuous as possible they are made of a transparent, or at least colorless, plastic material.

The line 23 is attached to the forward end of the bar by any well known device and when it pulls the bar forwardly, the tubular element 19 is pulled through the water and the inclination of the vane 22 causes it to exert a downward thrust on the tubular element 19 and on the minnow head, which stabilizes them and prevents the minnow head, and body, from rotating or rolling with unnatural movement.

The vane 22 also is made concave or dished on its forward face as shown so that forward movement through the water causes it to reciprocate laterally from side to side. This movement is communicated to the tubular element 19 and to the minnow head. The forward movement of the head combined with the side-to-side movement of the head, gives the head a sinusoidal movement that causes the whole minnow to have a movement simulating the natural forward swimming of a live minnow. This deceives the predatory fish and he takes the bait.

In the form of the invention of Figs. 7 to 9, the forward end of a bar 24 is projected into the vent 4 through the minnow body and out from its mouth.

A hook 25 is permanently connected to the rear end of the bar 24 preferably by welding its shank thereto; or by having an eye looped through a hole in the bar, not shown.

A tubular element 26 is telescoped on the forward end of the bar 24 where it protrudes from the mouth; and the line 27 is then attached to the forward end of the bar.

The bar is pulled forwardly until its rearward end disappears inwardly of the vent, leaving only the hook 25 exposed.

The upper side of the bar 24 is provided with a series of notches 28—28.

The bar 24 is rectangular in cross section and the inner wall of the tubular element 26 fits it to prevent rotation of the bar in the tubular element.

The tubular element 26 has a pin 29 in a hole 30 engageable at its inner end with the notches 28, and at its outer end is connected to a flat spring 31.

The spring 31 has one end secured to the top of the tubular element as at 32 with the other end free as at 33.

The pin 29 may be lifted to disengage the notches by the operator upon engaging his finger nail under the free end 33 of the spring and raising it.

The tubular element 26 is then slid on the bar 24 into the minnow's mouth and hookedly locked therewith by its barbs 34, as described for the first form.

In the final position of the tubular element 26 the pin 29 is released and engages with a notch 28, preventing displacement of the bar.

The mode of operation is the same as that of the first described form, including the action of a vane 35 in the tubular element 26.

Minnows as used for bait vary in length from 2" to 4".

In either of the above described embodiments of the invention the rearward end of the bar is adjustably retracted in the vent to a final position far enough to be invisible; and at its forward end the bar is locked to the tubular element after sliding the tubular element thereon. Thus the attachment means is adapted to all lengths of minnow.

The tubular element and its depending vane in both embodiments is preferably formed by molding plastic material as mentioned; and the barbs are preferably made from spring steel wire embedded at one end in the material when being molded.

In some instances, particularly with the larger fish, the downward thrust on the head may need to be increased for stability and to prevent rolling.

To this end, the modification shown in Figs. 10 and 11 may be used.

Here the vane 22A is inclined at a greater angle to the horizontal than the vane 22 in Figs. 1 to 9. Also, if wanted, a weight 36 of metal may be secured on the vane 22A preferable on its lower end, by forming it, in contour, with the upper part of the vane 22A, and securing, it thereto in any suitable manner, for example as shown by dowel pins 37—37 driven into both the weight 36 and the vane 22A.

The angle to the horizontal of the vane 22 in Figs. 1 to 9 is shown as approximately 45 degrees, and that of the vane 22A in Figs. 10 and 11 as approximately 60 degrees; but this angle is not critical and may be varied over a considerable range.

The barbs 20—20 of Figs. 1 to 6, and the barbs 34—34 of Figs. 7 to 9 are shown as inclined at a large angle to the horizontal and as divergizing at an angle from each other; but these angles also are not necessary nor critical. The barbs may even be parallel to each other and may be horizontal.

Also, in some cases, a single, barb instead of two barbs may be used.

Other changes and modifications may be made that will occur to those skilled in the art; and my invention is comprehensive of all changes and modifications that come within the scope of the appended claims.

I claim:

1. An attachment means for minnows comprising a bar extending through the minnow body and protruding forwardly from the minnow mouth and rearwardly from the minnow vent; a hook on the rearward end of the bar; the bar being movable forwardly to a final position to retract its rearward end inwardly through the vent to render it invisible and leave only the hook exposed; a tubular element telescoped on the forward protruding end of the bar; the bar and the inner wall of the tubular element fitting each other and both being non-circular in cross section to prevent rotation of the bar in the tubular elements; the tubular element being slidable on the bar to project its rearward end into the minnow's mouth and into abutting engagement with the minnow's flesh, and the tubular element carrying a barb having a forwardly projecting point that pierces the roof of the minnow's mouth; whereby the tubular element is locked to the minnow's head against movement out of the mouth and against rotary movement in the mouth, by parts wholly within the mouth; operator operable means to lock the bar and tubular element together in the said final position of the bar; a line attached to the forward end of the bar to draw the minnow through the water; a forwardly inclined vane depending from the tubular element, formed to react on the water to exert downward thrust on the tubular element and minnow's head to maintain the minnow right side up and prevent rolling thereof, and the vane having a forward face formed to react on the water and to cause the vane to be reciprocated from side to side, to cause the minnow's head to have side to side movement; the combined forward and side to side movements of the minnow's head giving it a sinusoidal movement forwardly through the water and causing the whole minnow to have movement simulating natural forward swimming movement.

2. In a line and hook attachment means for minnows, a bar extending through the body of the minnow with a forward bar portion protruding from the minnow mouth; a tubular element telescoped on the forward bar portion and projecting at its rearward end into the mouth and abutting upon flesh within the mouth; a barb projecting from a rearward portion of the tubular element and having a pointed end portion extending forwardly and piercing the flesh in the roof of the mouth; whereby the tubular element is locked to the head of the minnow by parts wholly within the mouth and in which the rearward portion of the bar may be extended out of the minnow vent and have a hook secured thereto, and may then be drawn forwardly to a final position at which the rear end of the bar is retracted inwardly through the vent and rendered substantially invisible; and in which when the bar has been drawn forwardly the tubular element may be slid rearwardly thereon; and in which means is provided to lock the bar, in its final position to the tubular element, a line is attached to the forward end of the bar to draw the minnow through the water; and the tubular element has a forwardly inclined vane depending therefrom, the vane formed to exert downward thrust on the tubular element and the minnow head, when drawn through the water to maintain the minnow right side up and prevent rolling thereof, and the vane having a forward face on which, when drawn through the water, the water reacts to cause the vane to reciprocate from side to side and move the tubular element and minnow head from side to side, whereby the combined forward and side to side movement of the minnow head cause it to have a sinusoidal forward movement and cause the whole minnow to move forwardly with a natural swimming motion.

3. An attachment means as described in claim 2 and in which the vane has a weight attached to its lower portion.

References Cited in the file of this patent

UNITED STATES PATENTS

| | | |
|---|---|---|
| 1,902,217 | Catarau | Mar. 21, 1933 |
| 2,087,369 | Woodring | July 20, 1937 |
| 2,565,956 | Duhamel | Aug. 28, 1951 |
| 2,603,026 | Duty | July 15, 1952 |